United States Patent [19]

Cameron et al.

[11] Patent Number: 5,793,538

[45] Date of Patent: Aug. 11, 1998

[54] SOLID CATADIOPTRIC LENS

[75] Inventors: Bruce A. Cameron, Simi Valley; Gino R. Sturiale, Woodland Hills, both of Calif.

[73] Assignee: Hughes Missile Systems Company, Los Angeles, Calif.

[21] Appl. No.: 866,667

[22] Filed: Jun. 2, 1997

Related U.S. Application Data

[63] Continuation of Ser. No. 470,523, Jun. 6, 1995, abandoned.

[51] Int. Cl.$^6$ .................... G02B 17/00; G02B 13/14
[52] U.S. Cl. ..................... 359/731; 359/356; 359/732
[58] Field of Search ........................ 359/732, 731, 359/730, 729, 728, 727, 350, 351, 356, 361

[56] References Cited

U.S. PATENT DOCUMENTS

| | | | |
|---|---|---|---|
| 4,322,135 | 3/1982 | Freeman | 359/727 |
| 4,835,380 | 5/1989 | Opheij et al. | 359/732 |
| 4,978,843 | 12/1990 | Yamakawa | 359/731 |
| 5,114,238 | 5/1992 | Sigler | 359/728 |
| 5,373,151 | 12/1994 | Eckel, Jr. et al. | 359/726 |
| 5,444,250 | 8/1995 | Hanke | 250/352 |

FOREIGN PATENT DOCUMENTS

| | | |
|---|---|---|
| 080 566 | 6/1983 | European Pat. Off. . |
| 358 929 | 3/1990 | European Pat. Off. . |
| 437 102 | 7/1991 | European Pat. Off. . |
| A-31 19 498 | 12/1982 | Germany . |
| WO-A-95 02841 | 1/1995 | WIPO . |

*Primary Examiner*—David C. Nelms
*Assistant Examiner*—Jordan M. Schwartz
*Attorney, Agent, or Firm*—Charles D. Brown; Michael W. Sales; Wanda K. Denson-Low

[57] ABSTRACT

A solid catadioptric lens (10) includes substantially planar input surface (14), primary concave mirror 18, secondary convex mirror (22) and substantially spherical exit surface (24). The lens is composed of solid material (12) chosen according to the particular imaging application in which the lens is to be used. Radiation enters lens through input surface (14), travels through solid material (12) and is reflected off of primary mirror (18). Radiation subsequently passes internally through solid material (12) and is reflected off of secondary mirror (22). Subsequent to being reflected off of secondary mirror (22), radiation (30) passes through solid material (12) and out of lens (10) through spherical exit surface (24) and onto detector array (34) for imaging purposes.

8 Claims, 3 Drawing Sheets

SOLID CATADIOPTRIC LENS

This is a continuation of application Ser. No. 08/470,523, filed Jun. 6, 1995 now abandoned.

BACKGROUND OF THE INVENTION

1. Field of the Invention

This invention relates generally to optical systems, and in particular to a solid catadioptric lens for focusing light onto an image detector array.

2. Discussion

Imaging systems are well known in the art and typically incorporate optical configurations for focusing a detected scene onto a detector array. In many imaging systems, the optical configuration entrance pupil diameter (EPD) and focal length are critical parameters. Many imaging systems also require optical configurations to exhibit broad spectral coverage and high optical transmission. Further, certain imaging systems are implemented along with corresponding optical configurations in thermally-sensitive applications, such as infrared imaging applications, where the systems must exhibit high cold shield efficiency and rapid cooldown of detector arrays. Also, imaging systems are often incorporated in applications in which optical configuration manufacture, assembly and cost considerations are critical.

An imaging system optical configuration may be one of many types. One type consists of a refractive, non-reimaged (RN-R) multiple lens configuration. An RN-R lens configuration is effective in imaging a scene onto an associated detector array, but has a limited spectral bandwidth due to: (1) lens material dispersion; and (2) the refractive powers of the lenses required for the effective focal length (EFL), color correction and passive athermalization. In addition, an RN-R lens configuration exhibits reduced transmission due to the fact that radiation passing through the configuration has to traverse numerous lens-air interfaces. An RN-R configuration also requires assembly with tight lens decenter and tilt tolerances. An RN-R configuration with a stop located aft of the lens, exhibits a significant amount of beam wander on the first configuration element, and thus requires an EPD smaller than the first element. An RN-R configuration with a stop forward or inside of the lens limits cold shield efficiency, and thus thermal sensitivity, in infrared imaging applications.

A second type of optical configuration consists of an all reflective, Cassegrain or Gregorian (A-R) mirror configuration. This type of configuration, composed of two mirrors, requires extremely tight alignment tolerances. In addition, an A-R configuration is characterized by a reduced cold shield efficiency, and thus exhibits more beam wander or vignetting in infrared applications.

A third type of imaging configuration is the catadioptric, reimaged (CR) optical configuration. Such a configuration consists of two mirrors and several lenses in combination, and thus a significant number of parts requiring precision assembly. Further, very tight mirror tilt and decenter tolerances must be maintained in such an optical configuration. A CR configuration also exhibits reduced transmission characteristics due to the fact that radiation must traverse a number of lens-air interfaces. In addition, a CR configuration has a spectral bandwidth limited by lens material dispersion and the refractive powers of relay lenses needed for image relay and color correction.

What is needed then is an infrared imaging configuration that overcomes the above optical limitations of present imaging optical configurations, that requires minimal assembly and that can be manufactured at a minimal cost.

SUMMARY OF THE INVENTION

According to the teachings of the present invention, a solid catadioptric lens is provided for use in imaging applications over a large spectral bandwidth, including the infrared, visible and ultraviolet spectrums. The present invention provides a lens having a relatively long focal length for a relatively short available optical configuration package length. The lens of the present invention also exhibits a relatively small angular resolution, thus being particularly useful for long distance object detection purposes.

The solid catadioptric lens of the present invention combines reflective and refractive properties of other lens, mirror and lens/mirror optical configurations into a single solid lens. As a result, the solid catadioptric lens of the present invention exhibits reduced size, has fewer parts and requires less assembly than other optical imaging configurations. Additionally, the solid catadioptric lens of the present invention is capable of being produced in high volume at a relatively low cost.

In the preferred embodiment, the solid catadioptric lens of the present invention has a planar or long radius convex input surface. A primary mirror is positioned relative to the input surface to reflect radiation passing through the input surface from a detected object scene. A secondary mirror is positioned relative to the primary mirror for focusing the light reflected from the primary mirror. The solid catadioptric lens of the present invention also has a substantially spherical exit surface that transmits focused radiation reflected from the second mirror. The focused radiation is passed from the exit surface to a detector for imaging applications.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
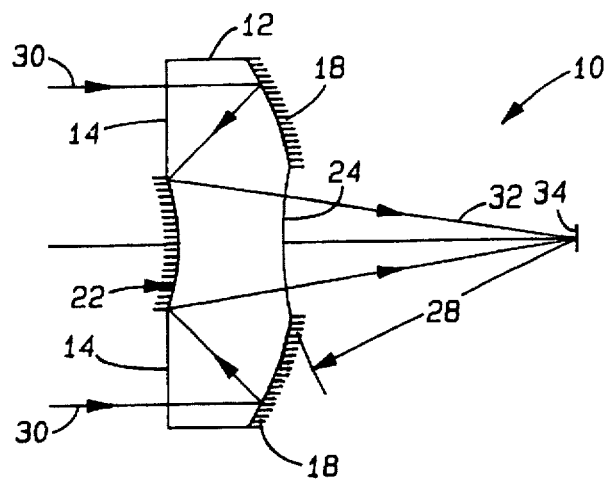
FIG. 1 is a side elevation view of a solid catadioptric lens and raytrace in accordance with the present invention.

Turning now to the Figures, a compact single solid catadioptric lens is shown generally at 10 in FIG. 1. The lens 10 is composed in large part of a solid material 12 that is chosen according to the particular spectral band of interest in a given application. The material used preferably has a high refractive index, and lens 10 is preferably fabricated from the material first by single point diamond turning the optical surfaces and then post polishing the optical surfaces if required for scatter suppression. For visible to medium wave infrared imaging applications, clear zinc sulfide or zinc selenide is preferably used as material 12. For medium wave infrared applications, silicon or gallium arsenide is preferably used as material 12. In long wave infrared applications, germanium or gallium arsenide is preferably used as material 12. Alternately, if a lower refractive index material (with associated larger beam wander) is acceptable (such as Corning's CLAP glass, see Applied Optics, 1 Apr. 1991, p. 1285) the preferable fabrication approach is molding via pressing.

Still referring to FIG. 1, solid catadioptric lens 10 includes substantially planar (or long radius convex) input surface 14. Input surface 14 is formed as a planar surface from material 12 to reduce the amount of chromatic aberration exhibited by light entering lens 10 from a distant object. Opposite input surface 14 is a concave annular primary mirror 18 which is preferably formed by application of mirror coatings on material 12 and which is adjacent to input surface 14. Secondary mirror 22 is also preferably formed by application of a mirror coating on material 12 opposite primary mirror 18 as shown. Primary mirror 18, in combination with convex secondary mirror 22, form a Cassegrain-like mirror combination in lens 10. As a result, secondary mirror 22 magnifies an image reflected from primary mirror 18. Primary mirror 18 and secondary mirror 22 are positioned relative to one another such that the distance of secondary mirror 22 to the focus of primary mirror 18 is much less than the distance from secondary mirror 22 to final image 34.

Solid catadioptric lens 10 also includes preferably spherical exit surface 24. Exit surface 24 has a radius, indicated at 28, substantially equal to the axial distance, indicated by 26, separating the solid catadioptric from focal plane 34. As input surface 14 departs from planar, exit surface radius 28 must become shorter to correct chromatic aberration introduced by a convex radius on input surface 14.

In operation, radiation, indicated generally at 30, from a detected object enters lens 10 through input surface 14. Radiation 30 enters through solid catadioptric material 12 and is reflected off primary mirror 18 back through solid catadioptric material 12 onto secondary mirror 22. Radiation reflected onto secondary mirror 22 is then reflected again through solid catadioptric material 12 and through exit surface 24, and the object radiation is focused at focal plane 34.

Figure 2:
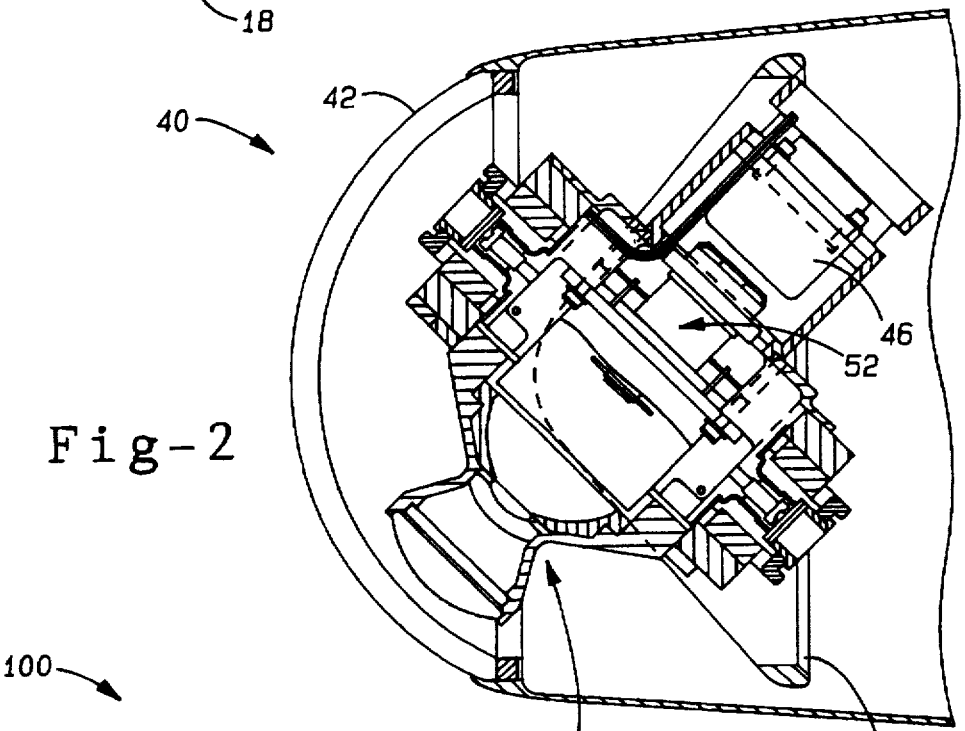
FIG. 2 is a side elevation cross-sectional view of an exemplary environment in which the lens of FIG. 1 may be implemented.

Lens 10 may be implemented in many of the imaging applications well known to those skilled in the art and, through use of an appropriate solid catadioptric material, may be used for imaging applications in a wide variety of spectral bands. One of the applications contemplated for lens 10 is for imaging a thermal scene onto a detector array in small gimballed infrared sensors incorporated in infrared missile seekers. Turning to FIG. 2, an environment in which lens 10 may be implemented is shown generally at 40. The particular environment is within dome 42 of a gimballed infrared missile seeker (not shown). Within dome 42 is located Dewar assembly indicated generally at 52. Dewar assembly 52 houses the detector array onto which a thermal scene is focused, as will be described in more detail below. Gyro 46 is operative for measuring missile position data and is positioned adjacent to Dewar assembly 52. Both Dewar assembly 52 and gyro 46 are mounted on gimbal 48 in a manner well known to those skilled in the art.

Because such an infrared imaging system requires small angular resolution, the entrance pupil diameter of the optical configuration must be maximized. Only a limited amount of space is available in which to implement the imaging system including Dewar assembly 52, gyro unit 46 and solid catadioptric lens 10, which must be implemented in the space indicated at 53 on gimbal 48.

Figure 3:
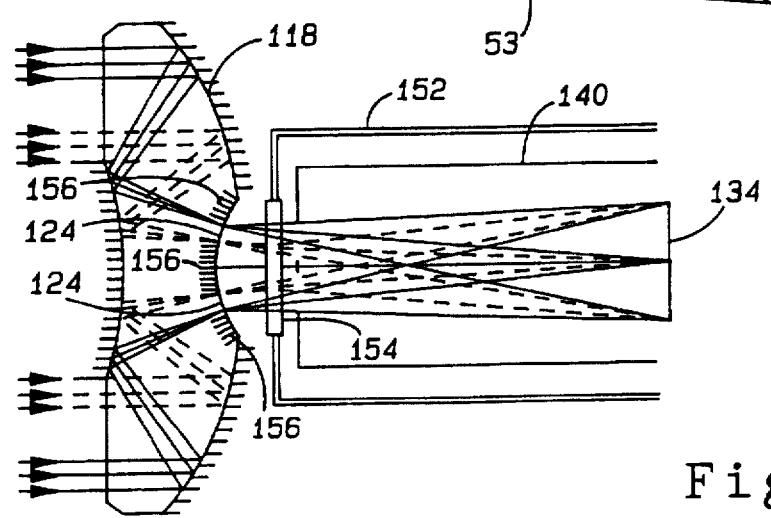
FIG. 3 is a side elevation view with accompanying raytrace of a second embodiment in accordance with the present invention.

Referring to FIG. 3, a second embodiment of a solid catadioptric lens is shown generally at 100. Lens 100 is identical to lens 10 shown in FIG. 1, with the addition of warm stop reflectors 156. Reflectors 156 on the rear surface of the solid catadioptric lens, comprised of a central spot and outer annual region, leave an annular transparent region 124 to pass radiation proceeding to detector 134. In this embodiment, the reflective coatings for 156 are deposited onto one continuous substantially spherical exit surface, as is the rear surface of lens 100. Warm stop reflectors 156 function to reduce thermal background radiation from reaching the detector 134. (For non-thermal imaging applications, the annulus and central spot 156 would not be reflectors but would be absorbing coatings in the detector waveband.) Between solid catadioptric exit surface 124 and cold shield 140 is Dewar window 154. Dewar window 154 functions as a vacuum barrier for Dewar 152 to maximize cooling of detector array 134.

Figure 4:
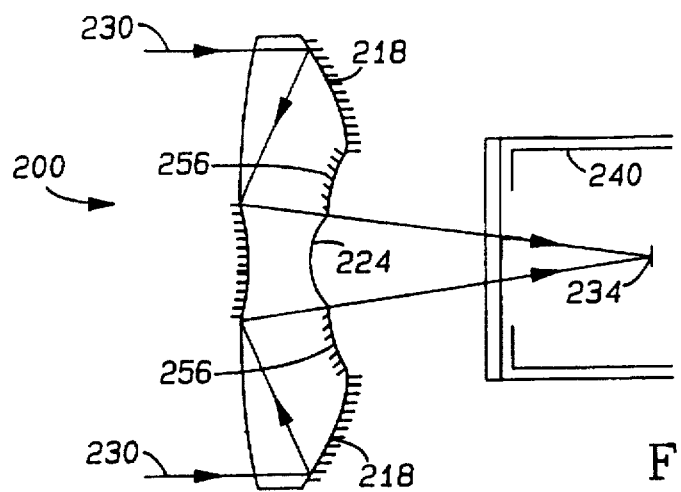
FIG. 4 is a side elevation view with accompanying raytrace of a third embodiment in accordance with the present invention.

Referring to FIG. 4, a third embodiment of the solid catadioptric lens of the present invention is shown generally at 200. Lens 200 is identical to lens 100, with the the exception that reflective warm stop 256 is located on a surface of the rear of lens 200 and is discontinuous with spherical exit surface 224. Thus, the rear face of lens 200 has three separate surfaces: primary annular mirror 218; reflective warm stop 256 and spherical exit surface 224. The lens otherwise functions in exactly the same manner as lens 100 in FIG. 3 to focus radiation 230 reaching the image 234.

Figure 5:
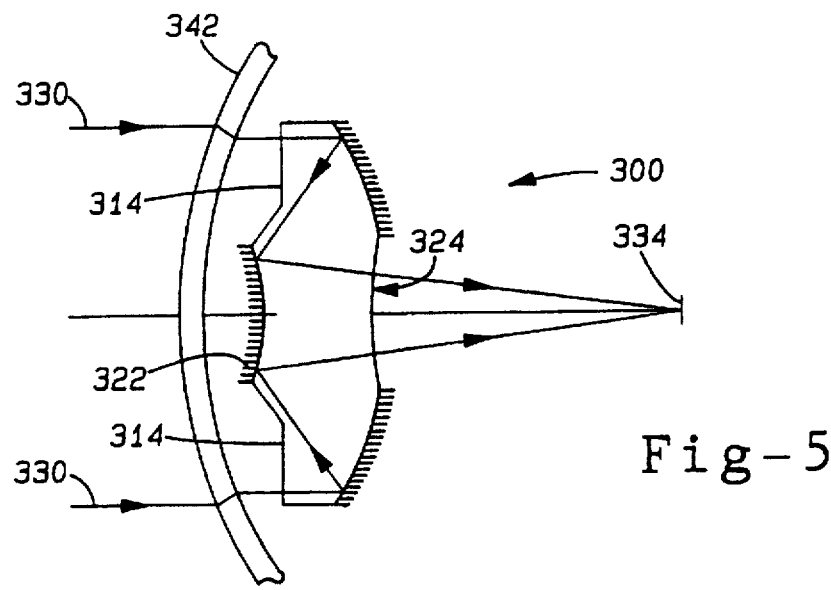
FIG. 5 is a side elevation view with accompanying raytrace of a fourth embodiment in accordance with the present invention.

Turning now to FIG. 5, a lens 300 is shown implemented behind dome 342 in an infrared imaging system for focusing radiation 330 reaching the image 334. Solid catadioptric lens 300 shown in FIG. 5 incorporates the same components as lens 10, 100 and 200 with the difference being planar input surface 314 is recessed slightly with respect to secondary mirror 322 to facilitate clearance of lens 300 from dome 342. Recessed input surface 314 results in system improvement in that lens weight is reduced.

As dome 342 introduces chromatic aberration to lens 300, input surface 314 may depart from flat to balance the chromatic aberration as light 330 passes through dome 342. Chromatic aberration introduced by dome 342 may also be balanced through modification of the radius of exit surface 324.

In many infrared imaging applications, a thermal scene must often be imaged within seconds after application of power to the system and subsequent to only seconds of cooling of the detector. Because it is critical to cool the detector for infrared thermal imaging, the detector and surrounding shield must be rapidly cooled. To facilitate rapid cooling of the detector and the surrounding shield, the thermal mass of both the detector and the surrounding shield must be minimized. To minimize the thermal mass of the cold shield, the length of the cold shield must be minimized.

Figure 6:
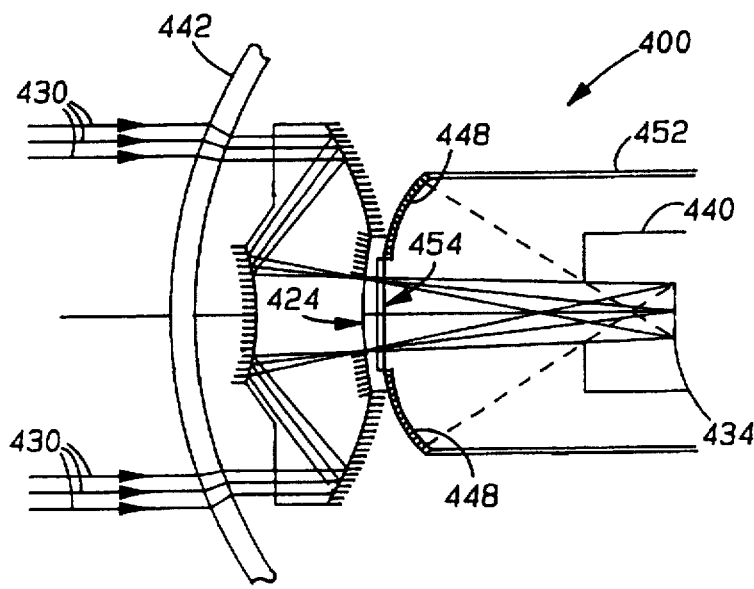
FIG. 6 is a side elevation view with accompanying raytrace of a fifth embodiment in accordance with the present invention.

Referring now to FIG. 6, a solid catadioptric lens, shown generally at 400, is implemented on-gimbal behind dome 442. Lens 400 incorporates the same components as lenses 10, 100, 200 and 300, with input surface 414 being recessed as in lens 300. In addition, a detector array (not shown) is enclosed within short cold shield 440.

As shown in FIG. 6, the length of cold shield 440 is minimized by incorporating reflecting warm shield 448 near solid catadioptric exit surface 424. Warm shield 448 is reflective-coated and functions to reduce background radiation reaching the image 434 when a long cold shield and cold stop cannot be used. Between solid catadioptric exit surface 424 and reflecting warm shield 448 is Dewar window 454. Dewar window 454 functions as a vacuum barrier for Dewar 452 to maximize cooling of the detector array. Design parameters for lens 400 are adjusted to compensate for radiation 430 passing from spherical exit surface 424 and additionally through Dewar window 454 before being focused on the detector array.

Figure 7:
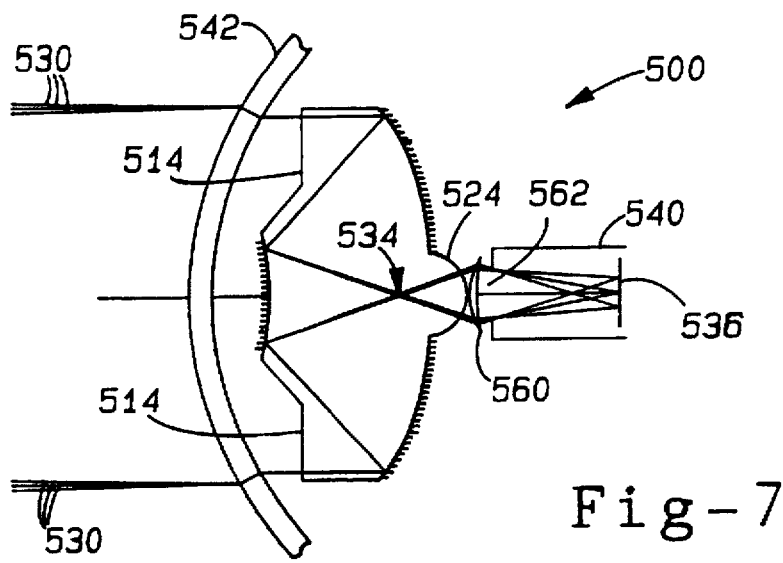
FIG. 7 is a side elevation view with accompanying raytrace of a sixth embodiment in accordance with the present invention.

Turning now to FIG. 7, solid catadioptric lens 500 is shown. Lens 500 is mounted on-gimbal behind dome 542. Lens 500 incorporates the same components as lenses 10, 100, 200, 300 and 400 for focusing the radiation 530 and has a recessed input surface 514, as with lenses 300 and 400. In addition, lens 500 has a convex spherical exit surface 524 and is designed so that image 534 is formed internal to lens 500. Convex exit surface 524, along with relay lens 560, relays internal image 534 onto detector 535 contained within cold shield 540. The opening in cold shield 540 which is cold stop 562, functions as the aperture stop of the imaging system.

Figure 8:
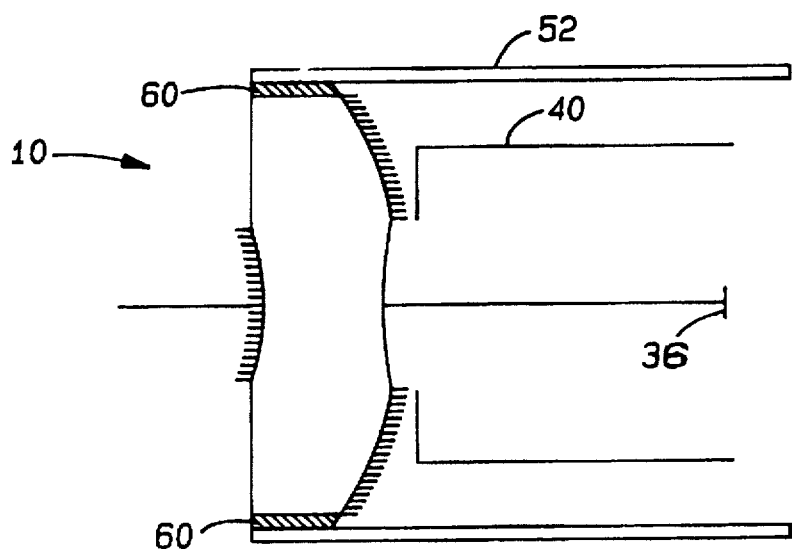
FIG. 8 is a side elevation view of a seventh embodiment in accordance with the present invention.

Referring to FIG. 8, lens 10 is shown implemented in an infrared imaging system. It should be appreciated that infrared imaging optical configurations typically are composed of focusing optics and a Dewar with a flat window that provides a vacuum barrier between the optical configuration and the detector array, thereby facilitating rapid cooling of the detector array within the Dewar and minimal cooling to maintain a cold detector. As the size of infrared optical systems become smaller, it is desirable to combine functions and eliminate parts within the infrared optical configuration. As shown in FIG. 8, lens 10 both focuses a detected scene onto detector array 34 within cold shield 40 and sustains a vacuum for Dewar 52. Lens 10 is attached to the Dewar wall 52 with a brazing material 60. The lens, used as such, saves dome space and eliminates the need for a separate flat window for vacuum barrier purposes in Dewar 52, as with the configuration shown in FIG. 6.

In general, the dimensional requirements for a solid catadioptric lens will vary according to the particular application in which the lens is to be used.

The solid catadioptric lens systems described above reduce the volume required for implementation of an optical configuration in an imaging system. The present invention also eliminates assembly required in other optical configurations and reduces the cost of both manufacture and implementation of such existing optical configurations. When implemented on-gimbal in an infrared missile-seeking system the lens also provides balance to the system by offsetting the weight of the gyro unit typically mounted on-gimbal.

It should be understood that while this invention has been described in connection with particular examples as set forth in FIGS. 1-8, various modifications, alterations, variations and changes of the present embodiment can be made after having the benefit of studying the specification, figures and following claims.

What is claimed is:

1. An infrared imaging system, comprising:
    a solid catadioptric lens including:
        a body of optical material having front and rear faces;
        a substantially planar input surface on the front face;
        a primary mirror on the rear face for reflecting radiation passing through said input surface from a detected object scene;
        a secondary mirror on the front face for focusing said reflected radiation from said primary mirror;
        a substantially spherical exit surface being substantially continuous with said rear face for passing said focused radiation from said secondary mirror;
    a detector located at the focal plane of said lens for detecting an image formed by said focused radiation;
    a Dewar assembly for housing said detector, said Dewar assembly including:
        a Dewar window in communication with said exit surface for receiving said focused radiation from said exit surface;
        a reflecting warm stop on said exit surface for facilitating rapid cooldown of said detector; and
        a cold shield surrounding said detector for cooling said detector in infrared imaging applications.

2. The infrared imaging system of claim 1, wherein said mirrors are formed of coatings of reflective material on the front and rear faces of said body of material.

3. The infrared imaging system of claim 1, wherein said spherical exit surface has a radius substantially equal to or less than the distance separating said lens from a focal plane of said lens.

4. The infrared imaging system of claim 1, wherein said substantially planar input surface is recessed from said secondary mirror.

5. The infrared imaging system of claim 1, wherein said primary mirror is an annular mirror encompassing said spherical exit surface.

6. The infrared imaging system of claim 1, wherein said image is formed internal to said lens.

7. An infrared imaging system, comprising:
    a solid catadioptric lens, comprising:
        a body of optical material having front and rear faces;
        a substantially planar input surface on the front face;
        a primary mirror on the rear face for reflecting radiation passing through said input surface from a detected object scene;
        a secondary mirror on the front face for focusing said reflected radiation from said primary mirror to form an image; and
        a substantially spherical exit surface on the rear face for passing said focused radiation from said secondary mirror, said lens providing a vacuum barrier for a Dewar assembly in said infrared imaging system.

8. A solid catadioptric lens, comprising:
    a body of optical material having front and rear faces;
    a substantially planar input surface on the front face;
    a primary mirror on the rear face that reflects radiation passing through said input surface from a detected object scene;
    a secondary mirror on the front face that focuses said reflected radiation from said primary mirror to form an image;
    a substantially spherical exit surface that passes said focused radiation from said secondary mirror; and
    a reflecting warm stop on said lens and located between said input and exit surfaces that reduces background radiation reaching the formed image.

* * * * *